(12) United States Patent
Nakao

(10) Patent No.: US 6,330,001 B1
(45) Date of Patent: Dec. 11, 2001

(54) DEVICE AND COMPUTER-READABLE RECORD MEDIUM FOR IMAGE POSITION ADJUSTMENT

(75) Inventor: Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/150,146

(22) Filed: Sep. 9, 1998

(30) Foreign Application Priority Data

Sep. 10, 1997 (JP) .................................................. 9-262702

(51) Int. Cl.[7] .................................................. G06T 15/00
(52) U.S. Cl. .................... 345/629; 345/624; 345/630; 382/282; 382/284; 382/294; 358/450
(58) Field of Search .................................. 345/433, 435, 345/438, 113, 114; 382/199, 294, 284, 44, 6, 282; 358/2, 88, 107, 450, 501; 356/363, 359; 101/171, 365, 485

(56) References Cited

U.S. PATENT DOCUMENTS

| 4,566,125 | * | 1/1986 | Clumn ..................................... 382/48 |
| 4,635,293 | * | 1/1987 | Watanabe ................................ 382/44 |
| 4,829,373 | * | 5/1989 | Leberl ..................................... 358/88 |
| 5,451,976 | * | 9/1995 | Ito ........................................... 345/8 |
| 5,471,305 | * | 11/1995 | Yoneda ................................ 356/363 |
| 5,673,100 | * | 9/1997 | Morton ................................. 355/22 |
| 5,816,151 | * | 10/1998 | Wang .................................. 101/171 |
| 5,966,124 | * | 1/1999 | Devine ................................ 345/339 |
| 6,081,577 | * | 6/2000 | Webber ................................. 378/23 |

FOREIGN PATENT DOCUMENTS

| 363216336A | * | 9/1988 | (JP) ................................. H01L/21/30 |
| 5-298417 | | 11/1993 | (JP) . |
| 07084234A | * | 3/1995 | (JP) .................................. G02F/1/13 |
| 10197680A | * | 12/1996 | (JP) ................................ G21C/19/20 |

OTHER PUBLICATIONS

"Handbook of Image Analysis", Tokyo University Press, Japan, pp. 502–505, 538–548, 550–564 and 717–718.

* cited by examiner

Primary Examiner—Matthew Luu
Assistant Examiner—Wessner Sajous
(74) Attorney, Agent, or Firm—Ostrolenk, Faber, Gerb & Soffen, LLP

(57) ABSTRACT

An image position adjustment device which can let the user adjust alignment between two or more images easily and efficiently includes a feature extraction section, a display image generation section, and a displaying order setting section. The feature extraction section generates feature images which provide the user with clues effective for image position adjustment procedure corresponding to each of the images. The display image generation section generates a 'display image' for part or the whole of an image which has been selected by the user as the target of image position adjustment, using corresponding part or the whole of the feature image of the selected image. And the displaying order setting section sets displaying order of images so that the display image which has been generated by the display image generation section using the feature image of the selected image can be displayed in front of other images, and lets a display section display the images according to the displaying order. The user can adjust alignment between two or more images easily and efficiently, easily determining whether or not the selected image is in proper alignment with other images.

24 Claims, 11 Drawing Sheets

DEVICE AND COMPUTER-READABLE RECORD MEDIUM FOR IMAGE POSITION ADJUSTMENT

BACKGROUND OF THE INVENTION

The present invention relates to an image position adjustment device and a computer-readable record medium storing an image position adjustment program, for letting the user adjust positions of two or more images, for example, when the user has to input a widespread image of a subject into a computer but the user has to substitute the widespread image with two or more partial images of the subject.

DESCRIPTION OF THE PRIOR ART

These days, electronic cameras or digital cameras and scanners are commonly used for inputting image data into computers. However, the angle of view of electronic cameras and readable area of scanners are limited, and thus there may be cases where it is impossible to a input widespread image of a large subject or object at once. In such cases, a process for constructing an image of the subject by combining a plurality of partial images of the subject obtained independently becomes necessary. In such a process, image position adjustment procedure has to be executed to the partial images, in which an operator moves the positions of each partial image on the screen to achieve visual alignment (relationship) between the partial images, until the partial images reach appropriate positions in proper alignment.

As a conventional image position adjustment device which can be used for such image position adjustment procedure, there has been proposed a device which is disclosed in Japanese Patent Application Laid-Open No.HEI5-298417 "Image Alignment Device and the Usage Thereof". The image alignment device 1 according to the document comprises an image display means 2 such as a CRT for displaying images on the screen, a conversion means 3 for converting each image into an abstract image respectively by extracting feature points in the image whose pixel values are larger than a threshold value or which can be regarded as edge points according to 4-neighborhood method etc., a threshold value variation means 4 which is connected with the conversion means 3 for varying the threshold value, a polygon displaying means 5 for displaying a triangle on each of the abstract images, a polygon movement means 6 for letting the user move the triangles on the abstract images, a polygon transformation means 7 for letting the user transform a triangle on an abstract image displayed on the screen of the image display means 2 along with automatically transforming another triangle on another abstract image on the screen linked with the transformation of the former triangle, a polygon rotation means 8 for letting the user rotate the latter triangle on the other abstract image, a polygon scaling means 9 for letting the user scale up or down the latter triangle on the other abstract image, and an input means 13 such as a keyboard 11 and a mouse 12 for letting the user input instructions.

In the following, the operation and usage of the conventional image position adjustment device will be described. First, the user selects two images in which their alignment will be adjusted by inputting instructions from the input means 13. Subsequently, two abstract images A and B corresponding to the two images respectively are generated by the conversion means 3 by extracting feature points from the images. Subsequently, two abstract images A and B corresponding to the two images are displayed on the screen of the image display means 2, and two triangles T1 and T2 are displayed on the abstract images A and B respectively by the polygon displaying means 5. Subsequently, the user transforms the triangle T1 displayed on the abstract image A so that three apexes of the triangle T1 will overlie three arbitrarily selected feature points of the abstract image A. Along with the transformation, the triangle T2 is also transformed automatically by the polygon transformation means 7 corresponding to the transformation of the triangle T1, thereby almost the same triangles T1 and T2 are displayed on the abstract images A and B respectively. Subsequently, the user executes movement, rotation and scaling of the triangle T2 on the abstract image B using the polygon movement means 6, the polygon rotation means 8 and the polygon scaling means 9, so that three apexes of the triangle T2 will be exactly on three feature points of the abstract image B which correspond to the aforementioned three selected feature points of the abstract image A. Then, the two triangles T1 and T2 are overlapped together, and thereby the two images are overlapped with correct alignment.

As shown above, image position adjustment procedure between two images can be performed using the conventional image position adjustment device, by transforming polygons such as the triangles T1 and T2 displayed on the abstract images A and B so that the apexes of the triangles will overlie feature points which are common to the two abstract images A and B. However, the user is required to identify three or more corresponding pairs of feature points in two abstract images A and B which are displayed apart on the screen, therefore the user could not perform the image position adjustment procedure with efficiency. The conventional image position adjustment device can also display the abstract images A and B overlapped, or display the overlapped abstract images A and B with pixel value subtraction procedure, etc. However, the user could not easily judge whether a particular feature point displayed on the screen belongs to the abstract image A or the abstract image B, since an abstract image is composed of feature points only.

SUMMARY OF THE INVENTION

It is therefore the primary object of the present invention to provide an image position adjustment device, by which the user can adjust alignment between two or more images easily and efficiently.

Another object of the present invention is to provide a computer-readable record medium storing an image position adjustment program, by which the user can adjust alignment between two or more images on a computer easily and efficiently.

In accordance with a first aspect of the present invention, there is provided an image position adjustment device for letting the user adjust alignment between two or more images, comprising a feature extraction means, a display image generation means, and a displaying order setting means. The feature extraction means generates feature images which provide the user with clues effective for image position adjustment procedure corresponding to each of the images. The display image generation means generates a 'display image' for part or the whole of an image which has been selected by the user as the target of image position adjustment, using the corresponding part or the whole of the feature image of the selected image. And the displaying order setting means sets a displaying order of images so that the display image which has been generated by the display image generation means using the feature image of the selected image can be displayed in front of other images, and lets the display means display the images according to the displaying order.

In accordance with a second aspect of the present invention, in the first aspect, the display image generation means generates the display image using the feature image of the selected image and only for overlapping regions between the selected image and other images.

In accordance with a third aspect of the present invention, there is provided an image position adjustment device which utilizes an image memory for storing two or more images and an image attribute memory for storing information concerning the position and attributes of the images, displays the images stored in the image memory on a screen of a display means, and lets the user operating a pointing means adjust the positions of the images displayed on the screen by referring to the image attribute memory. The image position adjustment device comprises a feature extraction means, an image selection means, an image position changing means, a display image generation means, and a displaying order setting means. The feature extraction means generates feature images which provide the user with clues effective for image position adjustment procedure corresponding to each of the images which are stored in the image memory. The image selection means selects an image as the target of image position adjustment according to selection by the user using the pointing means, and stores the result of the selection in the image attribute memory as an attribute. The image position changing means changes the position of the image which has been selected by the image selection means according to movement of the pointing means, and stores the changed position of the selected image in the image attribute memory as the information concerning the position. The display image generation means generates a display image for part or the whole of the selected image, by referring to the image attribute memory and using the corresponding part or the whole of the feature image of the selected image. And the displaying order setting means sets a displaying order of images so that the display image which has been generated by the display image generation means using the feature image of the selected image can be displayed in front of other images, and lets the display means display the images according to the displaying order.

In accordance with a fourth aspect of the present invention, in the third aspect, the display image generation means generates the display image using the feature image of the selected image only for overlapping regions between the selected image and other images.

In accordance with a fifth aspect of the present invention, in the third aspect, the image position adjustment device further comprises a display method switching means. The display method switching means receives a request of the user for switching the display method, and lets the displaying order setting means set the displaying order of images so that the selected image will be displayed in front of other images if the user requested switching of display method.

In accordance with a sixth aspect of the present invention, in the third aspect, the feature extraction means generates the feature images as binary images by executing edge detection procedure and binarization procedure to the images which are stored in the image memory.

In accordance with a seventh aspect of the present invention, in the sixth aspect, the display image generation means generates the display image for part or the whole of the selected image by copying the corresponding part or the whole of the feature image of the selected image.

In accordance with an eighth aspect of the present invention, in the third aspect, the feature extraction means generates the feature images as multivalued images by executing an edge detection procedure to the images which are stored in the image memory.

In accordance with a ninth aspect of the present invention, in the eighth aspect, the display image generation means generates the display image for part or the whole of the selected image by copying the corresponding part or the whole of the feature image of the selected image.

In accordance with a tenth aspect of the present invention, in the eighth aspect, the display image generation means generates the display image for part or the whole of the selected image using the corresponding part or the whole of the feature image of the selected image by binarization of the feature image.

In accordance with an eleventh aspect of the present invention, in the third aspect, the image position adjustment device further comprises a rotation means for rotating the selected image according to instructions of the user.

In accordance with a twelfth aspect of the present invention, in the third aspect, the image position adjustment device further comprises a scaling means for scaling up and scaling down the selected image according to instructions of the user.

In accordance with a thirteenth aspect of the present invention, there is provided a computer-readable record medium storing an image position adjustment program for letting the user execute image position adjustment procedure for adjusting alignment between two or more images on a computer. The image position adjustment program instructs the computer to realize a feature extraction function, a display image generation function, and a displaying order setting function. The feature extraction function generates feature images which provide the user with clues effective for the image position adjustment procedure corresponding to each of the images. The display image generation function generates a display image for part or the whole of an image which has been selected by the user as the target of image position adjustment, using the corresponding part or the whole of the feature image of the selected image. And the displaying order setting function sets a displaying order of images so that the display image which has been generated by the display image generation function using the feature image of the selected image can be displayed in front of other images, and lets a display means display the images according to the displaying order.

In accordance with a fourteenth aspect of the present invention, in the thirteenth aspect, the display image generation function generates the display image using the feature image of the selected image only for overlapping regions between the selected image and other images.

In accordance with a fifteenth aspect of the present invention, there is provided a computer-readable record medium storing an image position adjustment program for instructing a computer to utilize one or more storage devices as an image memory for storing two or more images and an image attribute memory for storing information concerning the position and attributes of the images, for instructing the computer to display the images stored in the image memory on a screen of a display means, and let the user who operates a pointing means adjust the positions of the images displayed on the screen by referring to the image attribute memory. The image position adjustment program instructs the computer to realize a feature extraction function, an image selection function, an image position changing function, a display image generation function, and a displaying order setting function. The feature extraction function generates feature images which provide the user with clues effective for image position adjustment procedure corresponding to each of the images which are stored in the image memory. The image selection function selects an image as the target of image position adjustment according to selection by the user using the pointing means, and stores the result of the selection in the image attribute memory as an attribute. The image position changing function changes the position of the image which has been selected by the image selection function according to movement of the pointing means, and stores the changed position of the selected image in the image attribute memory as the information concerning the position. The display image generation function generates a display image for part or the whole of the selected image, by referring to the image attribute memory and using the corresponding part or the whole of the feature image of the selected image. And the displaying order setting function sets a displaying order of images so that the display image which has been generated by the display image generation function using the feature image of the selected image can be displayed in front of other images, and lets the display means display the images according to the displaying order.

In accordance with a sixteenth aspect of the present invention, in the fifteenth aspect, the display image generation function generates the display image using the feature image of the selected image only for overlapping regions between the selected image and other images.

In accordance with a seventeenth aspect of the present invention, in the fifteenth aspect, the image position adjustment program further instructs the computer to realize a display method switching function. The display method switching function receives a request of the user for switching the display method, and lets the displaying order setting function set the displaying order of images so that the selected image will be displayed in front of other images if the user requested switching of the display method.

In accordance with an eighteenth aspect of the present invention, in the fifteenth aspect, the feature extraction function generates the feature images as binary images by executing an edge detection procedure and a binarization procedure to the images which are stored in the image memory.

In accordance with a nineteenth aspect of the present invention, in the eighteenth aspect, the display image generation function generates the display image for part or the whole of the selected image, by copying the corresponding part or the whole of the feature image of the selected image.

In accordance with a twentieth aspect of the present invention, in the fifteenth aspect, the feature extraction function generates the feature images as multivalued images by executing an edge detection procedure to the images which are stored in the image memory.

In accordance with a twenty-first aspect of the present invention, in the twentieth aspect, the display image generation function generates the display image for part or the whole of the selected image, by copying corresponding part or the whole of the feature image of the selected image.

In accordance with a twenty-second aspect of the present invention, in the twentieth aspect, the display image generation function generates the display image for part or the whole of the selected image using the corresponding part or the whole of the feature image of the selected image, by binarization of the feature image.

In accordance with a twenty-third aspect of the present invention, in the fifteenth aspect, the image position adjustment program further instructs the computer to realize a rotation function for rotating the selected image according to instructions of the user.

In accordance with a twenty-fourth aspect of the present invention, in the fifteenth aspect, the image position adjustment program further instructs the computer to realize a scaling function for scaling up and scaling down the selected image according to instructions of the user.

According to a twenty-fifth aspect of the present invention, there is provided an image position adjustment device that allows a user to adjust the aligment between two or more reference images comprising a feature extraction section that extracts features which provide the user with clues effective for image positon adjustment from each of the reference images and uses the extracted features to generate feature images associated with each of the refernce images, an image selection decice operable by a user to select at least one of the reference images as a target of image position adjustment, a display image generation section that generates a composite display image from components including part or the whole of the selected reference image, and at least one other reference image, using a corresponding part or the whole of the feature image associated with the selected image, a display unit operative to display the composite image, and a displaying order setting section that sets a layering order for display of the components of the display image on the display unit.

According to a twenty-sixth aspect of the present invention, there is provided a computer-readable recording medium storing an image position adjustment program for enabling a user to execute image position adjustment between two or more reference images on a computer, wherein the image position adjustment program instructs the computer to realize a feature extraction function for extracting features which provides the user with clues effective for image positon adjustment from each of the reference images and for using the extracted features to generate feature images correponding to each of the images, an image selection function responsive to selection by a user of at least one the reference images as a target of image position adjustment, a display image generation function for generating a composite display image from components including part or the whole of the selected reference image, and at least one other reference image, using a corresponding part or the whole of the feature image associatedwith the selected reference image, and a displaying order setting function for setting a layering order for dosplay of the components of the display image on a display unit.

According to a twenty-seventh aspect of the present invention, in the twenty-fifth aspect, the display images generation section generates the display image using the feature image of the selected reference image only for overlapping regions between the selected reference image and other reference images.

According to a twenty-eighth aspect of the present invention, in the twenty-sixth aspect, the display images generation function generates the display image using the feature image of the selected reference image only for overlapping regions between the selected reference image and other reference images.

BRIEF DESCRIPTION OF THE DRAWINGS

The objects and features of the present invention will become more apparent upon consideration of the following detailed description taken in conjunction with the accompanying drawings, in which.

DESCRIPTION OF THE PREFERRED EMBODIMENTS

Figure 1:
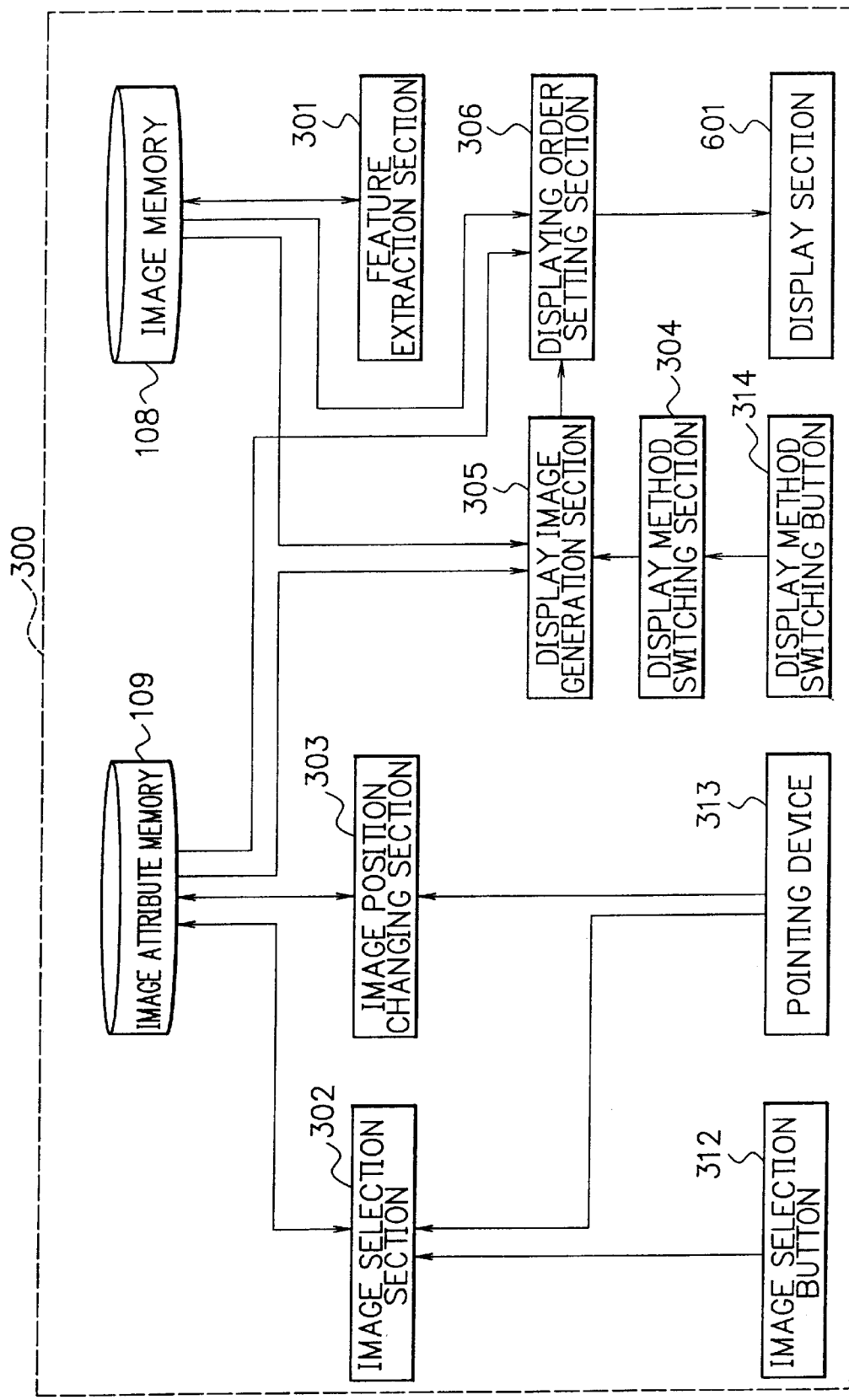
FIG. 1 is a block diagram showing a composition of an image position adjustment device according to an embodiment of the present invention.

Referring now to the drawings, a description will be given in detail of preferred embodiments in accordance with the present invention.

FIG. 1 is a block diagram showing a construction of an image position adjustment device 300 according to an embodiment of the present invention. Referring to FIG. 1, the image position adjustment device 300 comprises a feature extraction section 301, an image memory 108, an image selection section 302, an image selection button 312, a pointing device 313, an image changing section 303, a display method switching button 314, a display image generation section 305, a displaying order setting 306, a display section 601 and an image attribute memory 109.

Feature extraction section 301 extracts features which provide the user with keys and clues effective for image position adjustment from partial or reference images which asre stored in image memory 108 and thereby generates feature images corresponding to each of the images.

Image selection section 302 selects an image as the target of image position adjustment (hereafter referred to as 'a target image') by referring to the statuses and movement of imgage selection button 312 and pointing device 313 when operated by the user.

Image position changing section 303 changes the positon of the target picture which has been selected by the image selection section 302 by referring to the status and movement of pointing device 313 when operated by the user. Display method switching section 304 switches display methods according to the status and movement of a display method switching button 314 when operated by the user.

Display image generation section 305 generates a 'diaplay image' which will be described later according to the instructions of the display method switching section 304. Display order setting section 306 sets the order for displaying the images and the display image wgicg has been generated by the display image generation section 305 on the screen so that the user seeing the images on the screen will be able to discern the positional relationship (alignment) between the display images easily and properly.

Display section 601 displays the images on the screen according to the order which has been set by the displaying order setting section 306. The latter operates together with the aforementioned image selection button 312 by which the user enters images selection instructions and transmits the image selection instructions to the image selection section 302, the aforementioned pointing device 313 by which the user designates a target image and enters the distance and direction of movement of the tartget image, the aforementioned display method switching button 314 by which the user enters requests for switching display methods and transmits the requests to the display method switching section 304, and the aforementioned image memory 108 which stores images such as partial images and feature images. Image attribute memory 109 stores information on attributes of the images which are in the image memory 108.

The feature extraction section 301, the image selection section 302, the image position changing section 303, the display method switching section 304, the display image generation section 305 and the displaying order setting section 306 can be realized, for example, by a microprocessor unit which is composed of a CPU (Central Processing Unit), ROM (Read Only Memory), RAM (Random Access Memory), etc. The pointing device 313, the display method switching button 314 and the image selection button 312 can be realized, for example, by a locator device such as a mouse. The image memory 108 and the image attribute memory 109 can be realized, for example, by one or more storage devices such as an HDD (Hard Disk Drive), an MO (Magneto-Optical disk), a RAM, etc. The display section 601 can be designed specially for the image position adjustment device 300, however it is also possible to use a commercially available display unit. Incidentally, although the image position adjustment device 300 shown in FIG. 1 includes the image memory 108, the image attribute memory 109, the image selection button 312, the pointing device 313, the display method switching button 314 and the display section 601, part or all of them can be provided independently and connected to the image position adjustment device 300, for example, as will be shown in FIG. 4.

In the following, the operation of the image position adjustment device 300 of FIG. 1 will be described.

First, features which provide the user with keys and clues effective for image position adjustment procedure are extracted from the (partial) images which are stored in the image memory 108 and thereby the feature images are generated by the feature extraction section 301. The feature images generated by the feature extraction section 301 are stored in the image memory 108. Subsequently, the displaying order of the images in the image memory 108 is set by the displaying order setting section 306 based on the attribute information stored in the image attribute memory 109, and the images are displayed on the screen of the display section 601 according to the displaying order which has been determined by the displaying order setting section 306. Subsequently, the user selects a target image (i.e. an image whose position will be moved and adjusted by the user) using the pointing device 313 and the image selection button 312, and the selection is transmitted to the image selection section 302. Then, the user changes the position of the selected target image by giving instructions to the image position changing section 303 using the pointing device 313. In the image moving procedure, the user designates a desired display method using the display method switching button 314 and transmits the instruction to the display method switching section 304. Depending on the instruction of the user inputted to the display method switching button 314, the display image generation section 305 generates a display image using a feature image corresponding to the target image which has been stored in the image memory 108. The displaying order of images such as the display image, the target image and other (partial) images is determined by the displaying order setting section 306 so that the relationship and alignment between the images can easily be discerned, and the images are displayed on the screen of the display section 601.

In the following, concrete examples according to the embodiment will be described in detail referring to FIG. 2~FIG. 11.

Figure 2:
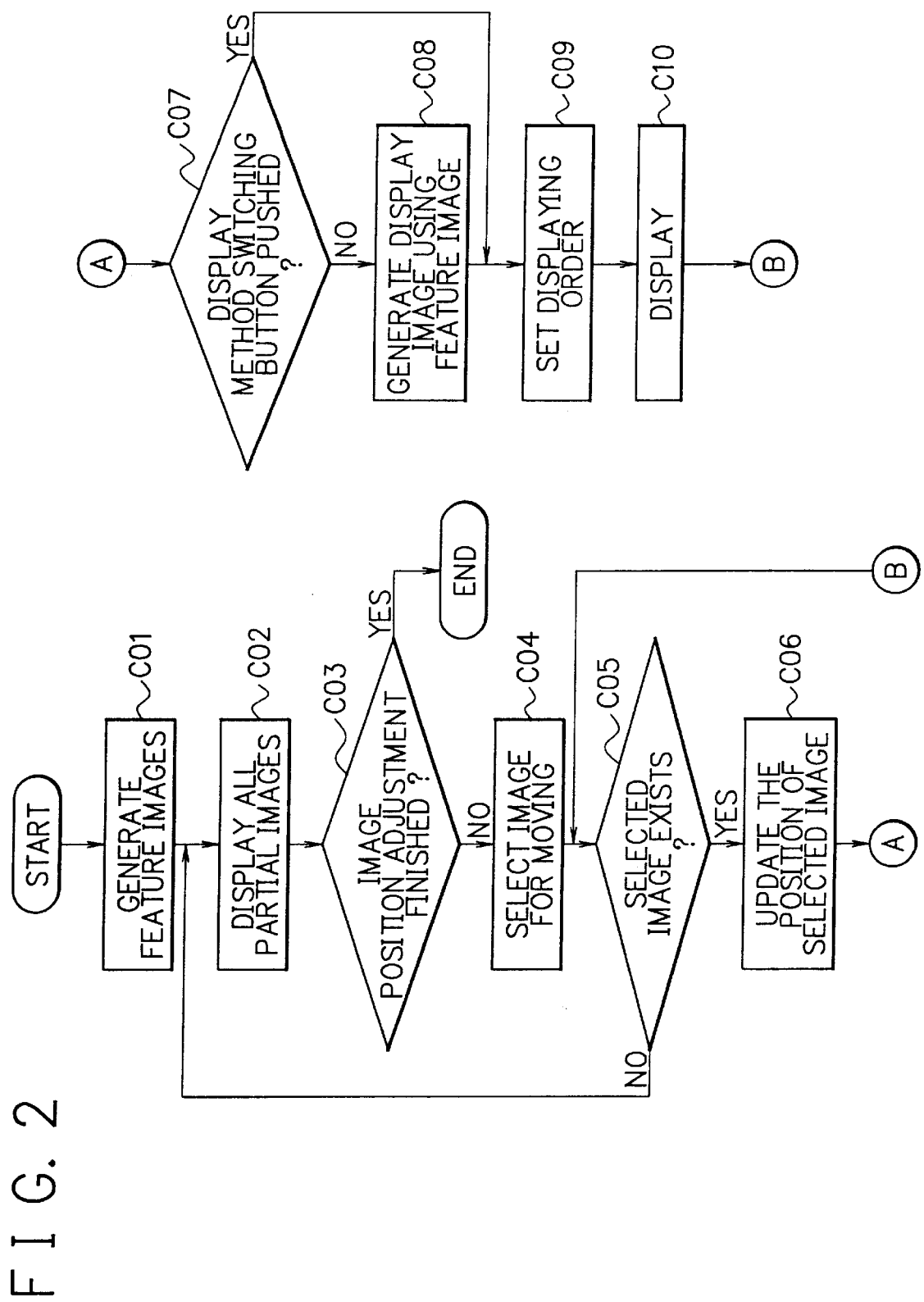
FIG. 2 is a flow chart showing the operation of the image position adjustment device of FIG. 1.

FIG. 2 is a flow chart showing the operation of the image position adjustment device 300. Incidentally, partial images of a subject are preliminarily stored in the image memory 108, and information on the positions and attributes of the partial images are preliminarily stored in the image attribute memory 109. However, it is also possible for the image position adjustment device 300 to input partial images and information on the positions and attributes of the partial images from an external source, using a communication device etc. In addition, the following explanation will be given on the assumption that each of the partial images is an image which is expressed by 256 steps of gray in which larger pixel values express lighter gray. Of course, the assumption is provided only for the sake of explanation, therefore the application of the present invention is not limited by the assumption. For, example, the image position adjustment device according to the present invention can be employed for color images, binary images, etc.

First, the feature extraction section 301 generates feature images which have clues for the user effective for easily detecting the alignment between images, corresponding to each partial image stored in the image memory 108, and the generated feature images are also stored in the image memory 108 (step C01). As the clues which are effective for detecting the alignment between images, edges of objects in the partial images are utilized in the embodiment. Such edge points can be detected in the partial images as points where density varies extremely and rapidly. Incidentally, the feature images are generated in the form of binary images.

In order to detect the edge points, the following Sobel operators are applied to the partial images.

$$\text{X-DIRECTION:} \begin{pmatrix} -1 & -1 & 1 \\ -2 & 0 & 2 \\ -1 & 0 & 1 \end{pmatrix}$$

$$\text{Y-DIRECTION:} \begin{pmatrix} -1 & -2 & -1 \\ 0 & 0 & 0 \\ 1 & 2 & 1 \end{pmatrix}$$

Using the results of the X-direction application and the Y-direction application of the Sobel operators, the following edge intensity E(x,y) at each point (x,y) of a partial image is obtained.

$$E(x, y) = \sqrt{(\text{X-DIRECTION RESULT})^2 + (\text{Y-DIRECTION RESULT})^2}$$

Based on the edge intensity E(x,y), pixel values F(x,y) at each point (x,y) in the feature image are determined as follows.

$$F(x, y) = \begin{cases} 0 & (E(x, y) < \text{THRESHOLD}) \\ 1 & (E(x, y) \geq \text{THRESHOLD}) \end{cases}$$

Figure 3:
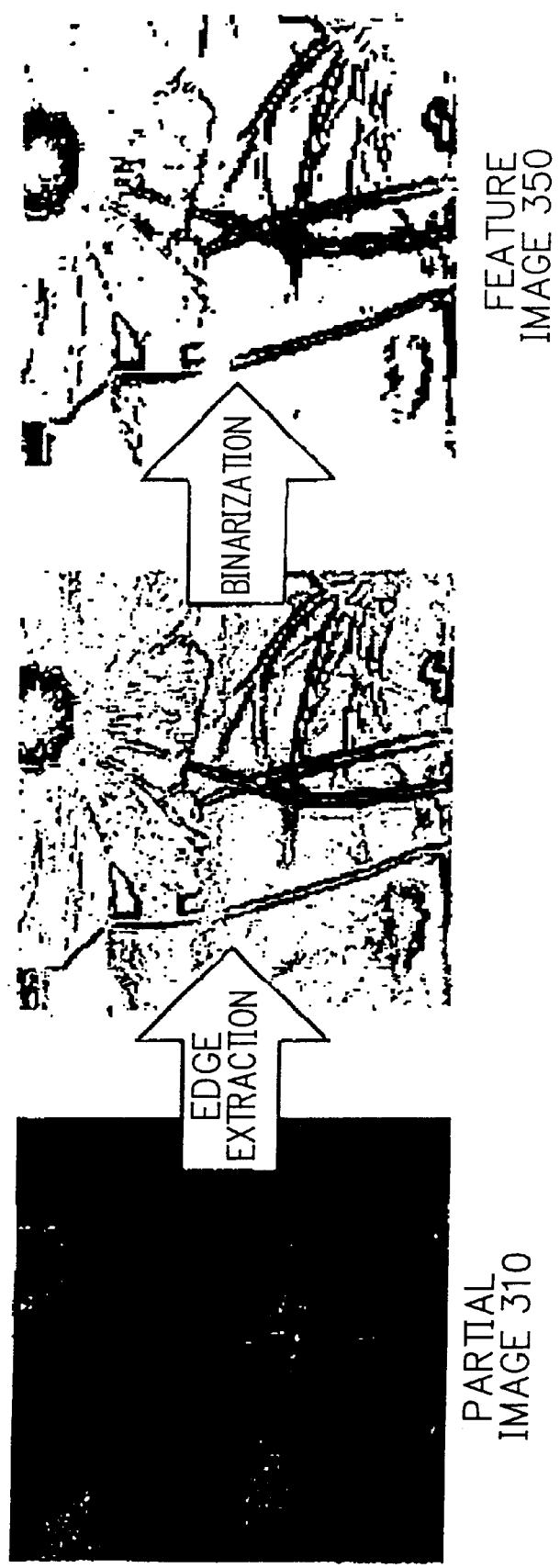
FIG. 3 is a schematic diagram explaining a feature image generation process which is executed by a feature extraction section of the image position adjustment device of FIG. 1.

In the above determination, the number of points in the feature image having the pixel value 1 becomes smaller if the threshold value is set larger, and on the contrary, many points having the pixel value 1 will be included in the feature image if the threshold value is set smaller. FIG.3 is a schematic diagram explaining the feature image generation process which is executed by the feature extraction section 301 of the image position adjustment device 300 according to the present invention.

Referring to FIG. 3, edge points are extracted from a partial image (i.e. the edge intensity E(x,y) of each point in the partial image is obtained) first, and then a feature image 350 is generated by the binarization process.

Although examples of an edge point detection procedure and a binarization procedure which can be employed by the feature extraction section 301 have been described above, the feature image generation process executed by the feature extraction section 301 is not limited to the above-mentioned procedures. Detection of edge points is one of the basic image processing processes, and thus various methods can be employed. It is also possible to execute a smoothing process utilizing a median filter etc. before the edge point detection process. By the smoothing process, satisfactory feature images can be obtained without effects of noise which has been included in the partial images. Detailed description of the smoothing process, binarization process, and edge point detection process are given in a document entitled "Handbook of Image Analysis", Tokyo University Press, Japan, pages 502–505, 538–548 and 550–564, and thus further description thereof is omitted here. Further, it is also possible to utilize other features than edges as described in pages 717–718 of the above document.

After the feature images have been generated by the feature extraction section 301, all the partial images stored in the image memory 108 are displayed on the screen of the display section 601 according to the displaying order which has been set by the displaying order setting section 306 (step C02). The displaying order setting section 306 can, for example, set the displaying order according to the order of image numbers which have been assigned to the partial images. The displaying order setting section 306 can also set the displaying order according to various other orders, for example, in the order of storing of the partial images into the image memory 108, in the order of nearness to the origin of the screen of the display section 601, etc.

In step C03, the user is asked whether or not alignment between partial images displayed on the screen of the display section 601 has already been adjusted correctly and whether or not the image position adjustment should be finished. If the user inputted the answer YES using the pointing device 313 etc., the image position adjustment process is ended. If the user inputted the answer NO, the following process will be repeated until adjustment of alignment between partial images is correctly finished and the user inputs the answer YES in the step C03.

Figure 4:
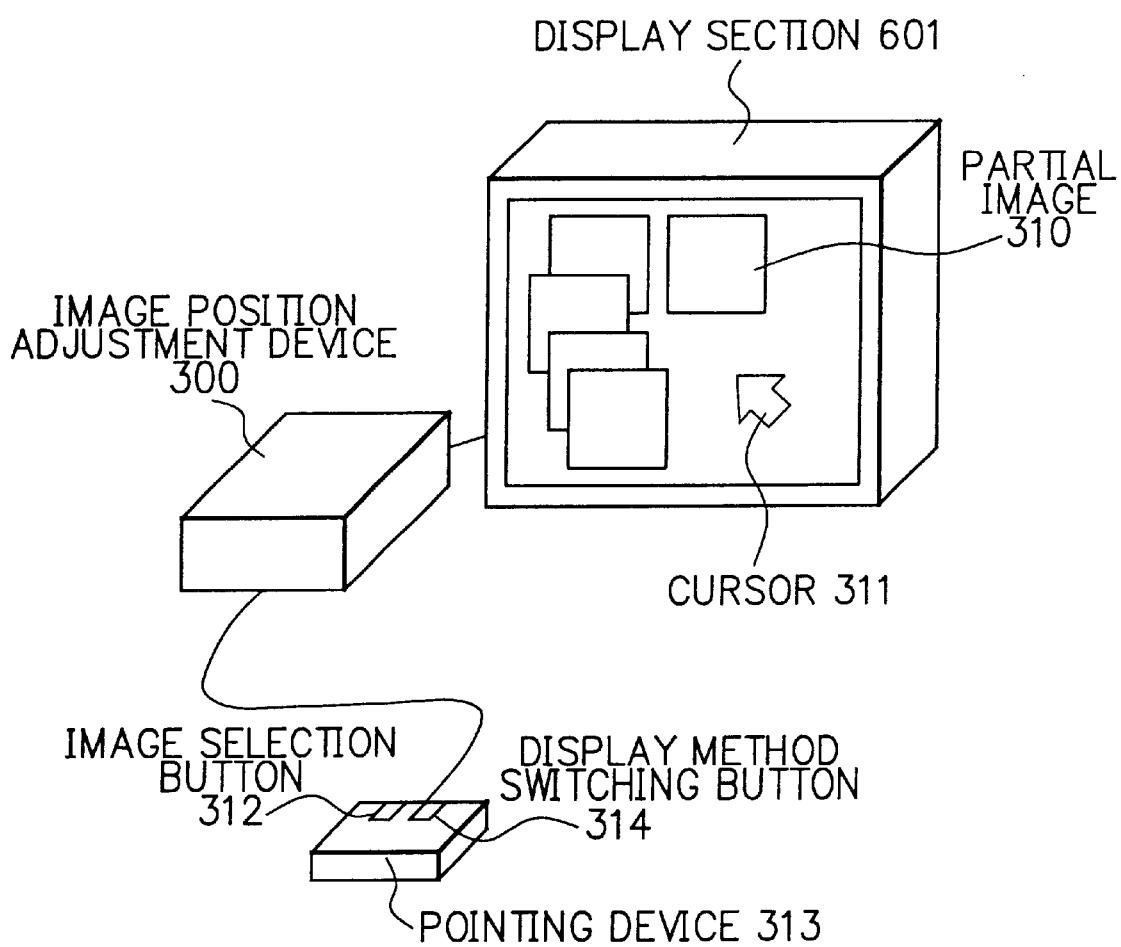
FIG. 4 is a schematic diagram showing a concrete example of the usage of the image position adjustment device of FIG. 1.

FIG. 4 is a schematic diagram showing a concrete example of the usage of the image position adjustment device 300. Incidentally, the image position adjustment device 300 shown in FIG. 4 does not include the display section 601, the image selection button 312, the pointing device 313 and the display method switching button 314, as mentioned before. The display section 601 is provided independently, and the image selection button 312, the pointing device 313 and the display method switching button 314 are realized by a mouse.

On the screen of the display section 601, a cursor 311 is displayed according to movement of the pointing device 313 which is operated by the user. The user moves the cursor 311 onto a partial image 310 which will be the target of image position adjustment (i.e. a target image) and pushes the image selection button 312, thereby the selection of the target image (the partial image 310) by the user is transmitted to the image selection section 302. Subsequently, the image selection section 302 recognizes the user's selection and selects the partial image 310 as the target image, by referring to the position of the cursor 311 on the screen of the display section 601 and the display position of the partial image 310 which is stored in the image attribute memory 109. Hereafter, a partial image which has been selected by the user (i.e. the target image) will also be referred to as a 'selected image 351'. Subsequently, a selection flag showing that the partial image has been selected as the target image is added to the attribute information of the selected image 351 which is stored in the image attribute memory 109 (step C04). Incidentally, the selection flag can be deleted by releasing the image selection button 312.

In step C05, the presence or absence of a selected image 351 is judged by the image selection section 302. If no selected image 351 exists, the process is returned to the step C02. If a selected image 351 exists, the process proceeds to the next step C06, and image position adjustment of the selected image 351 is executed according to steps C06 through C10 while the selection flag exists in the attribute information of the partial image 310 (i.e. the selected image 351) which is stored in the image attribute memory 109, that is, while a selected image 351 exists.

The user instructs the image position changing section 303 about the direction and distance of movement of the selected image 351 by moving the pointing device 313. The image position changing section 303 moves the selected image 351 on the screen of the display section 601 by updating the position information of the selected image 351 which is stored in the image attribute memory 109 according to the movement direction and movement distance of the pointing device 313 (step C06).

The display method switching section 304 detects the status of the display method switching button 314, and switches display methods according to the status (step C07). For example, if the display method switching button 314 is not being pushed at the step C07, the display image generation section 305 is instructed by the display method switching section 304 to generate a 'display image 353' which will be described later, and the display image 353 is generated by the display image generation section 305 (step C08). If the display method switching button 314 is being pushed at the step C07, the display image 353 is not generated by the display image generation section 305.

Incidentally, although the embodiment employs the display method switching section 304 and the display method switching button 314 so that the selected image 351 can be switched to the display image 353 and vice versa, of course it is also possible to omit the display method switching section 304 and the display method switching button 314 and always let the display image generation section 305 generate the display image 353. In such an example, the display method switching section 304 and the display method switching button 314 become unnecessary and thus construction of the image position adjustment device 300 can be simplified.

Figure 5:
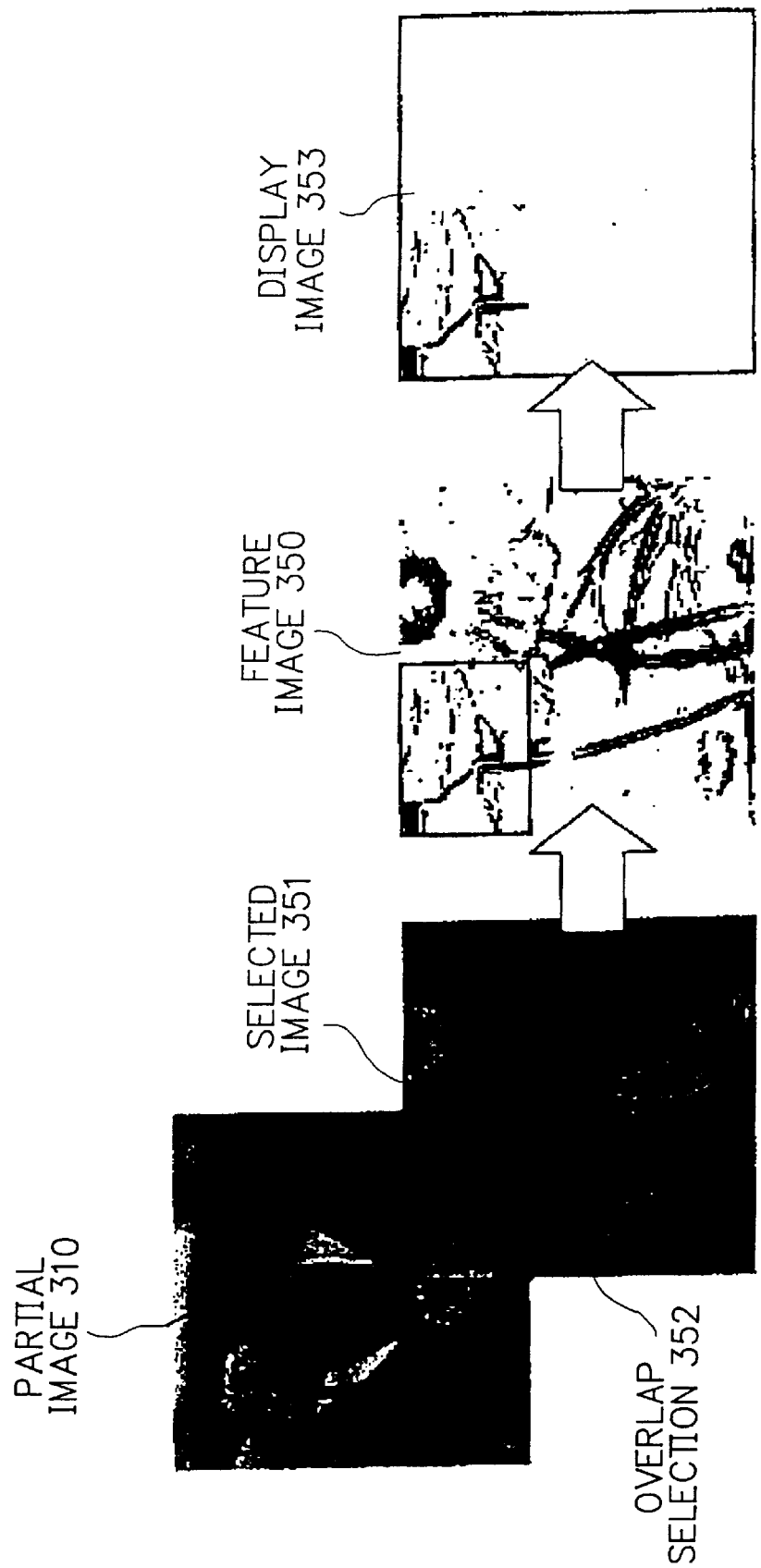
FIG. 5 is a schematic diagram showing a display image generation method employed by a display image generation section of the image position adjustment device of FIG. 1.

FIG. 5 is a schematic diagram showing a display image generation method employed by the display image generation section 305. First, a display image 353 is generated in the form of a binary image having the same size as the selected image 351 with pixel values of all the pixels initialized to 0. Subsequently, the size and position of an overlap region 352 between the selected image 351 and another partial image 310 are obtained, and a part of the feature image 350 corresponding to the selected image 351 whose size and position are the same as those of the overlap region 352 is copied onto the initialized display image 353. In other words, pixel values D(x,y) of each point (x,y) on the display image 353 are determined as:

D(x,y)=1 (if 'the point (x,y) is included in the overlap region 352 and F(x,y)=1') and D(x,y)=0 (if 'the point (x,y) is not included in the overlap region 352' or 'the point (x,y) is included in the overlap region 352 and F(x,y)=0').

In the case where the selected image 351 has two or more overlap regions 352 with two or more other partial images 310, the positions and sizes of the overlap regions 352 corresponding to each partial image 310 are obtained, and the aforementioned copying of a part of the feature image 350 corresponding to an overlap region 352 onto the display image 353 is repeated.

Incidentally, although a part of the feature image 350 corresponding to the overlap region 352 has been copied to the initialized display image 353 having the same size as the selected image 351 in the above explanation, it is also possible to generate another type of a display image 353 having the same size and position as those of the overlap region 352, by cutting out the part of the feature image 350 of the selected image 351 corresponding to the overlap region 352. According to the method, in the case where the selected image 351 has two or more overlap regions 352 with two or more other partial images 310, two or more display images 353 having the same sizes and positions as those of the overlap regions 352 are generated corresponding to each of the partial images 310.

Figure 6:
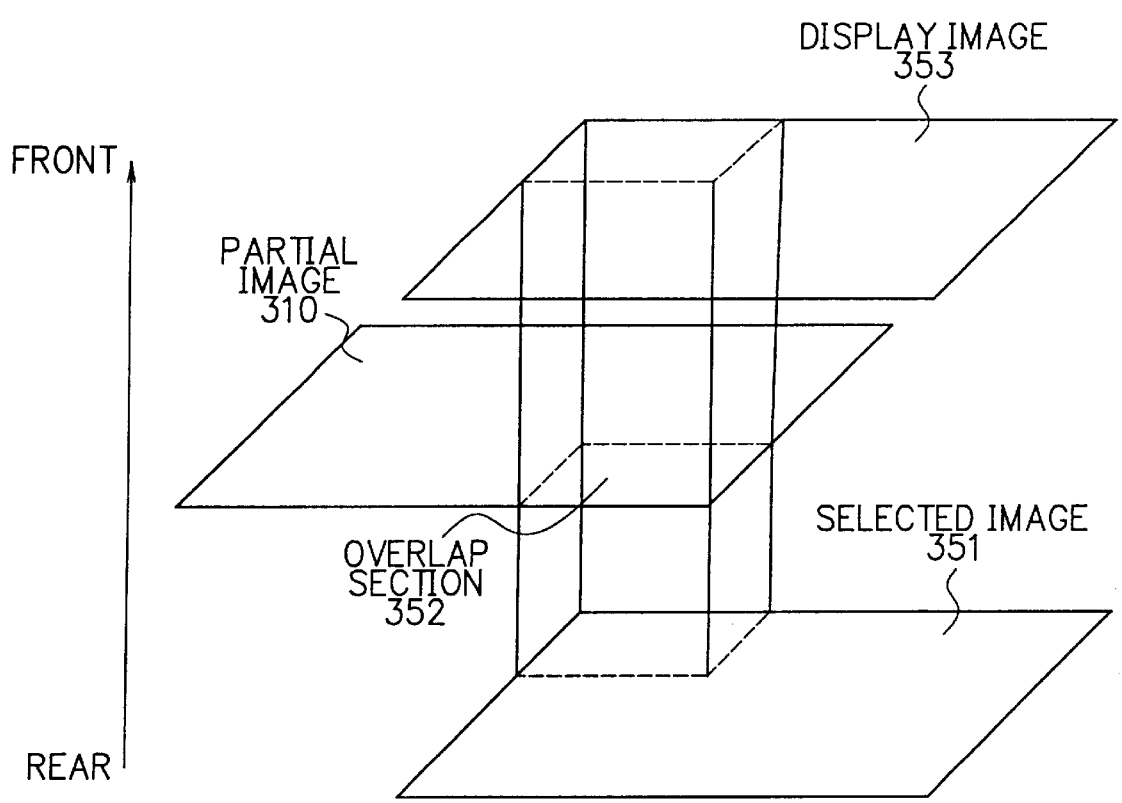
FIG. 6 is a schematic diagram explaining a displaying order setting method employed by a displaying order setting section of the image position adjustment device of FIG. 1 in the case where a display method switching button of the image position adjustment device of FIG. 1 is not pushed.
Figure 7:
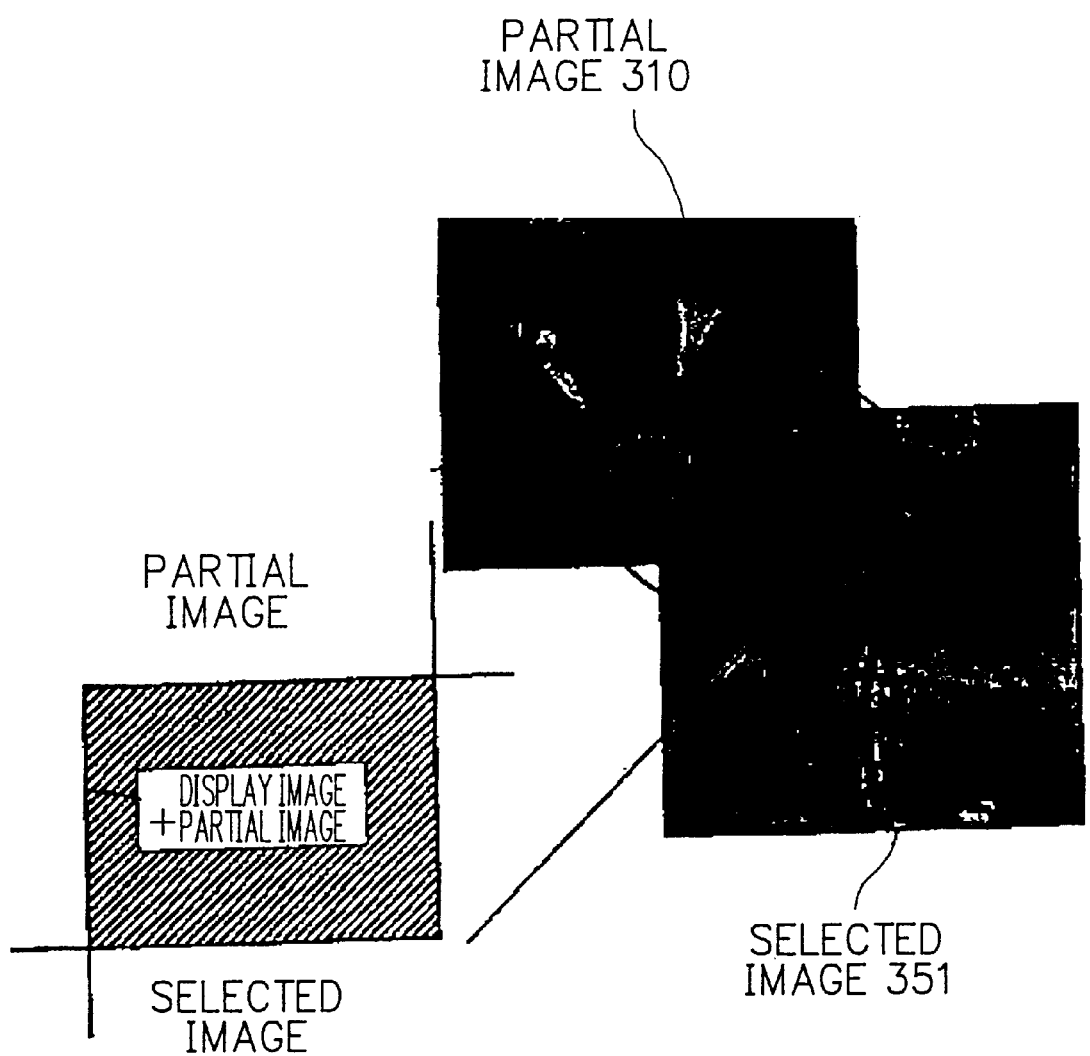
FIG. 7 is a schematic diagram explaining a displaying method employed by a display section of the image position adjustment device of FIG. 1 in the case where the display method switching button is not pushed.

FIG. 6 is a schematic diagram explaining a displaying order setting method employed by the displaying order setting section 306, in the case where the display method switching button 314 is not pushed in the step C07. FIG. 7 is a schematic diagram explaining a displaying method employed by the display section 601, in the case where the display method switching button 314 is not pushed in the step C07.

If a selected image 351 exists and a display image 353 has been generated by the display image generation section 305, the displaying order setting section 306 sets the displaying order so that the display image 353 will be placed at the forefront and the selected image 351 will be placed at the rear end as shown in FIG. 6 (step C09). The display section 601 displays the selected image 351 and the display image 353 along with another partial image 310 according to the displaying order which has been set by the displaying order setting section 306. Here, pixels in the display image 353 having pixel values 0 are treated as transparent pixels as shown in FIG. 7, and thereby the other partial image 310 and the selected image 351 which exist below the display image 353 are displayed on the screen of the display section 601 (step C10). In the overlap region 352, the other partial image 310 and the display image 353 which represents the features of the selected image 351 are displayed overlapped. Therefore, the user can easily judge whether or not the selected image 351 is in proper alignment with the other partial image 310, and thereby the selected image 351 can be moved into appropriate position with respect to the other partial image 310 easily and precisely.

Figure 8:
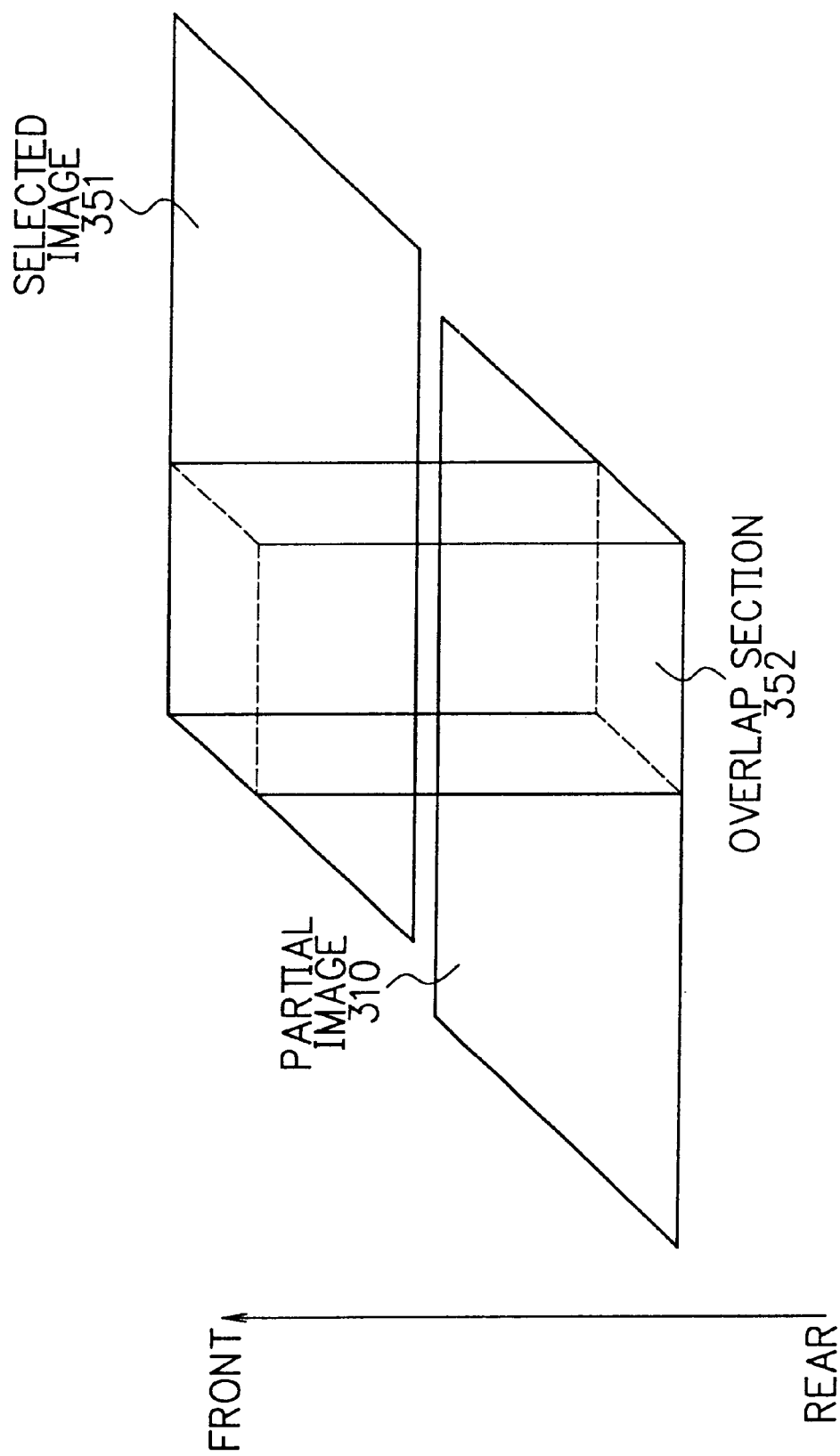
FIG. 8 is a schematic diagram explaining a displaying order setting method employed by the displaying order setting section in the case where the display method switching button is pushed.
Figure 9:
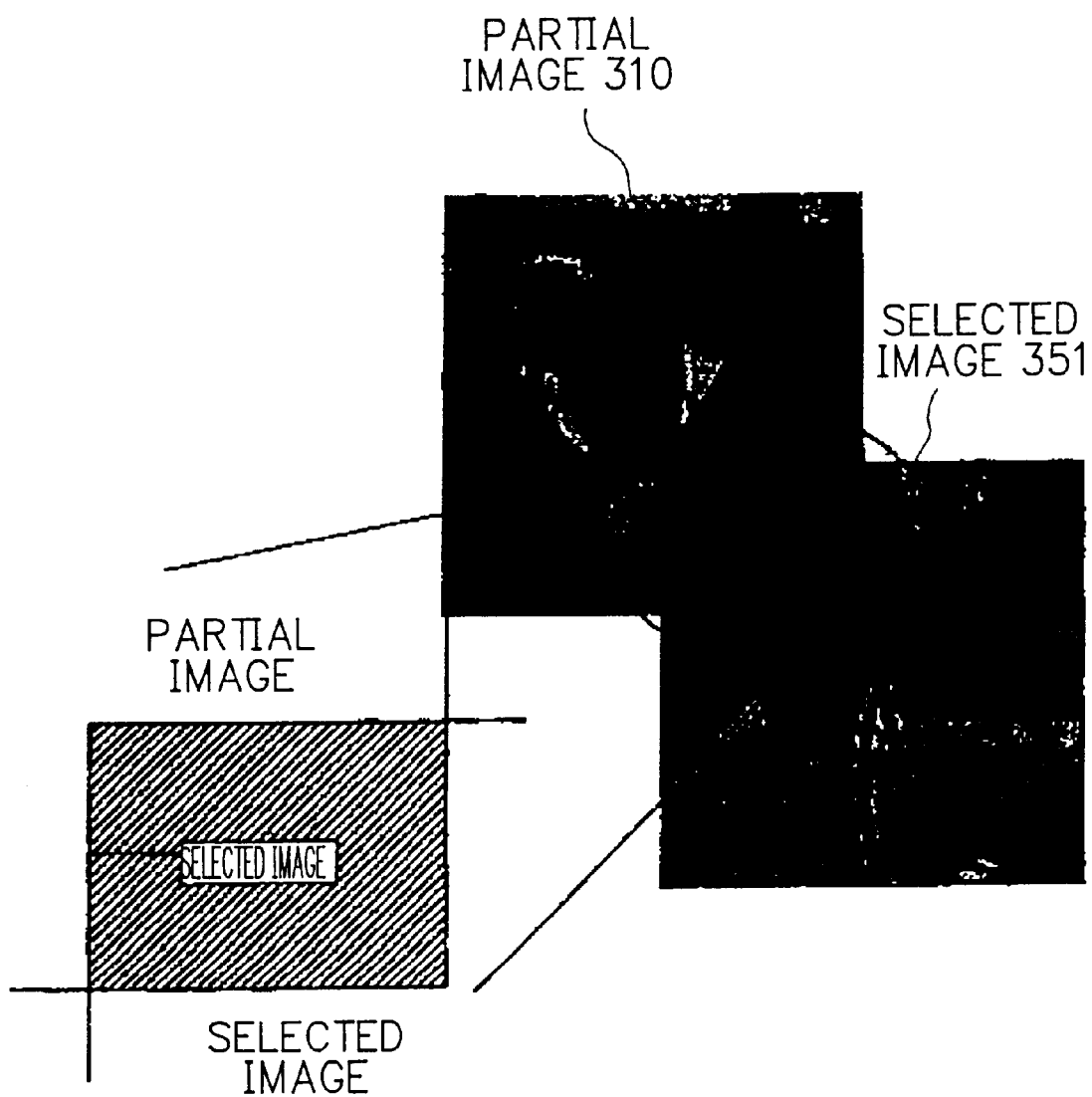
FIG. 9 is a schematic diagram explaining a displaying method employed by the display section in the case where the display method switching button is pushed.

FIG. 8 is a schematic diagram explaining a displaying order setting method employed by the displaying order setting section 306, in the case where the display method switching button 314 is pushed in the step C07. FIG. 9 is a schematic diagram explaining a displaying method employed by the display section 601, in the case where the display method switching button 314 is pushed in the step C07.

If the display method switching button 314 was being pushed at the step C07, the display image 353 is not generated by the display image generation section 305. If a selected image 351 exists and no display image 353 has been generated, the displaying order setting section 306 sets the displaying order so that the selected image 351 will be placed at the forefront as shown in FIG. 8 (step C09). As a result, the selected image 351 which is moved by the user is displayed on the screen of the display section 601 not hidden by other partial images 310 as shown in FIG. 9 (step C10). Therefore, the user can move the selected image 351 confirming image continuity between the selected image 351 and the partial images 310 at the edge of the selected image 351. Incidentally, although the display image 353 was not generated in the above explanation by the display image generation section 305 if the display method switching button 314 was being pushed at the step C07, it is also possible to let the display image generation section 305 always generate the display image 353 and switch the display method (i.e. the displaying order) only according to the status of the display method switching button 314, thereby the user is allowed to switch the display method between the two methods more quickly.

Figure 10:
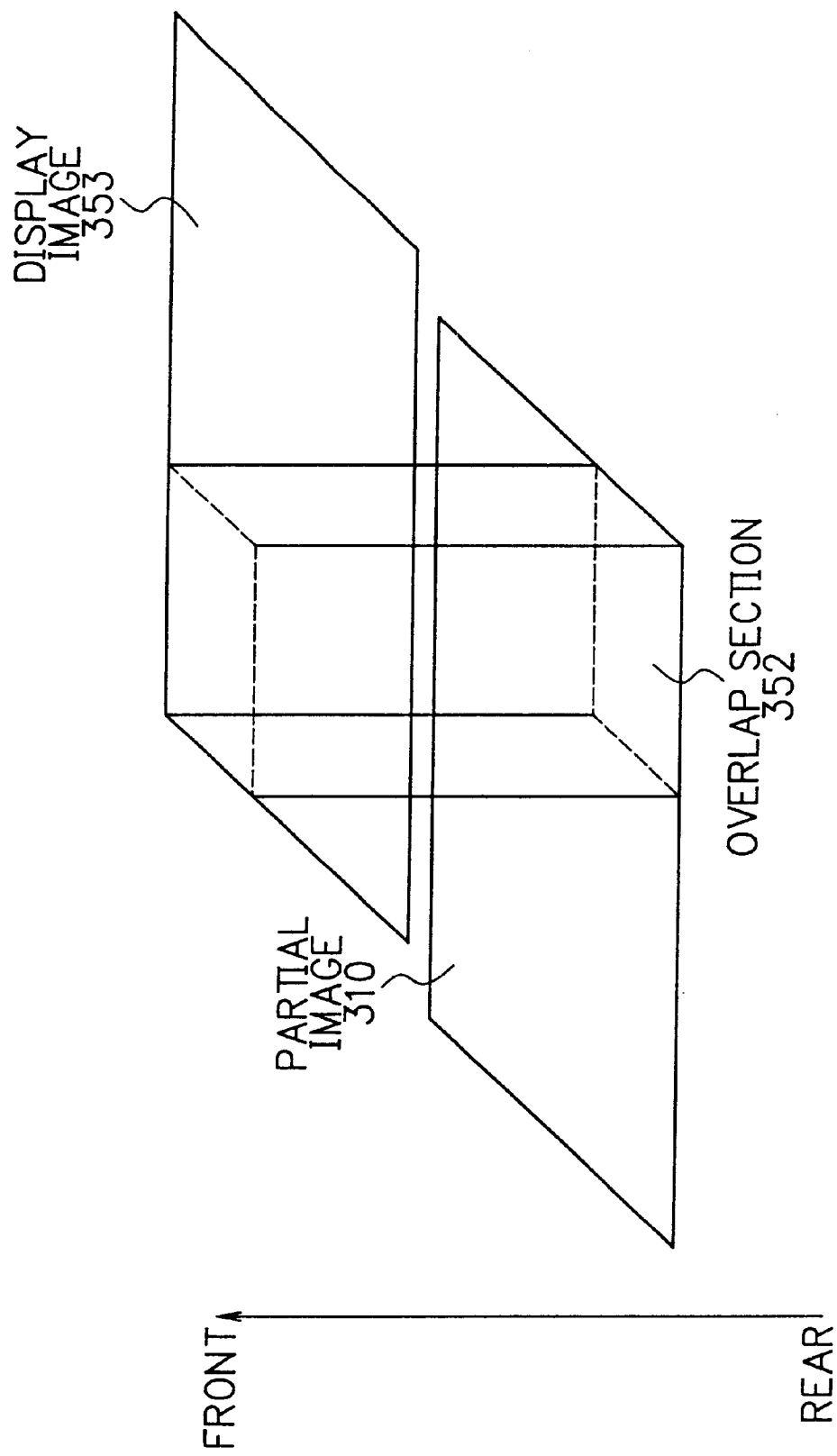
FIG. 10 and FIG. 11 are schematic diagrams explaining another display image generation method which can be employed by the display image generation section.
Figure 11:
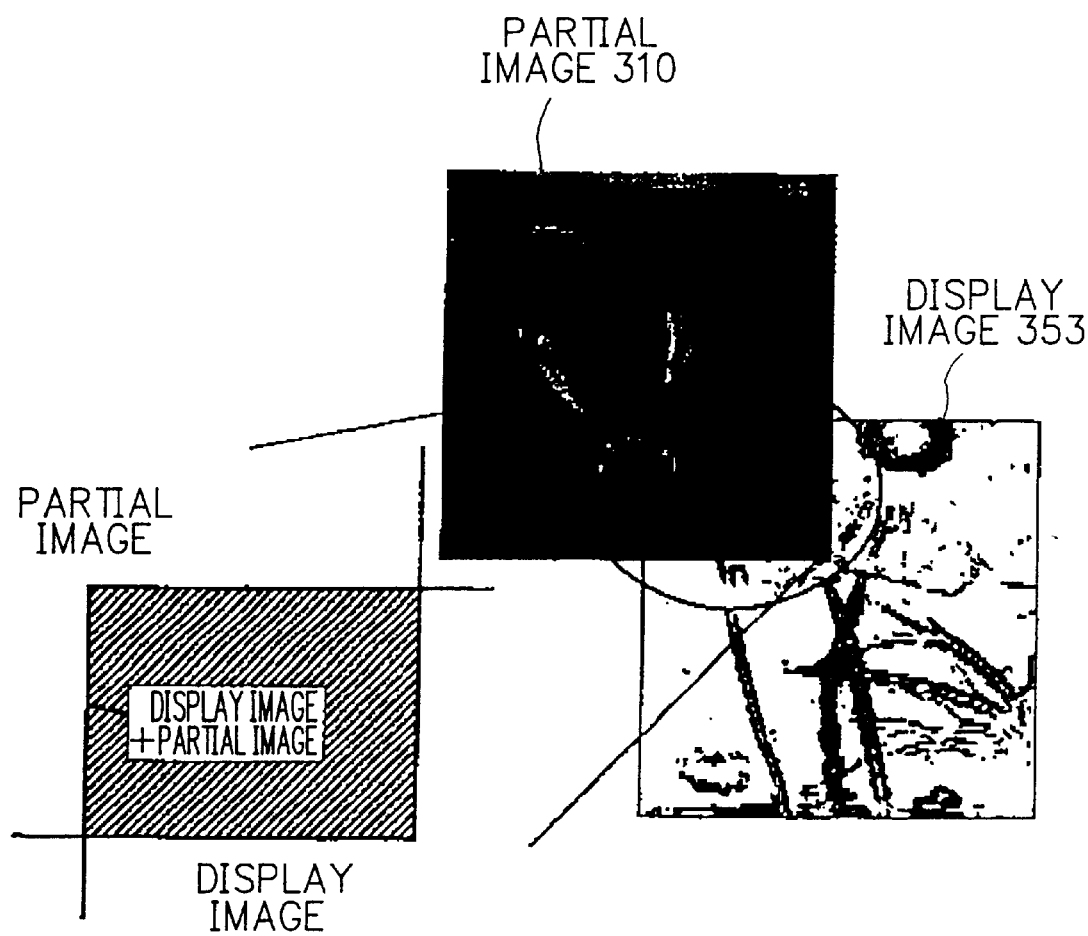

FIG. 10 and FIG. 11 are schematic diagrams explaining another display image generation method which can be employed by the display image generation section 305 in the step C08. Although the display image 353 was generated in the above explanation by copying a part of the feature image 350 of the selected image 351 corresponding to the overlap region 352 between the selected image 351 and the other partial image 310 onto the initialized display image 353, it is also possible to regard the feature image 350 itself as the display image 353. In such an example, the size and position of the overlap region 352 between the selected image 351 and the other partial image 310 are not needed to be obtained, and thus the display image generation procedure can be considerably simplified. The displaying order setting section 306 sets the displaying order so that such a display image 353 (i.e. the feature image 350 of the selected image 351) will be placed at the forefront of the screen as shown in FIG. 10 (step C09). In the step C10, the display image 353 which provides the user with effective clues for image position adjustment is displayed in front of other partial images 310 on the screen, in which pixels in the display image 353 having pixel values 0 are treated as transparent pixels as shown in FIG. 11, thereby the other partial image 310 which exists below the display image 353 is also displayed. Therefore, the user can easily judge whether or not the selected image 351 is in proper alignment with the other partial image 310, and thereby the selected image 351 can be moved into appropriate position with respect to the other partial image 310 easily and precisely.

After the step C10, process is returned to the step C05 and the following steps are executed again. If the image selection button 312 has been released and thereby the selection flag stored in the image attribute memory 109 has been deleted in the step C05, the process is returned to the step C02 and all the partial images 310 stored in the image memory 108 are displayed on the screen of the display section 601 according to the displaying order which has been set by the displaying order setting section 306.

As described above, in the image position adjustment device 300 according to the present invention, feature images 350 corresponding to each partial image 310 stored in the image memory 108 are generated by the feature extraction section 301 utilizing features of the partial images which provide the user with effective clues for image position adjustment procedure. A partial image 310 is selected by the user as a target image to adjust its position. While the position of the selected image 351 (the target image) is adjusted by the user, the display image 353 is generated by the display image generation section 305 using the feature image 350 of the selected image 351 which is stored in the image memory 108, and the display image 353 (and the selected image 351) and other partial images 310 are displayed on the screen of the display section 601 according to the displaying order which has been set by the displaying order setting section 306 so that alignment between the selected image 351 and other partial images 310 can be easily adjust. Therefore, the user can move the selected image 351 into the correct position, by easily determining whether or not the selected image 351 is in proper alignment with other partial images 310.

Incidentally, while only one partial image 310 was selected by the user as the selected image 351 in the above embodiment, it is also possible to arrange the image position adjustment device 300 so that two or more partial images 310 can be selected by the user as the selected image 351. For example, an image selection cancellation button and an image movement button can also be provided along with the image selection button 312. In such an example, the user can select two or more partial images 310 as the selected image 351, by moving the cursor 311 onto a desired partial image 310 and assigning a selection flag to the partial image 310 by pushing (clicking) the image selection button 312 and repeating the procedure one after another. All the selection flags of the selected partial images 310 can be deleted at once by pushing (clicking) the image selection cancellation button. The selected partial images 310 having the selection flags are regarded as the selected image 351 and moved together if the pointing device 313 is moved by the user with the image movement button pushed. The process from the step C06 is executed similarly regarding the selection partial images 310 as the selected image 351. By such composition, even when two or more partial images 310 are selected as the selected image 351, the selected image 351 can be moved by the user into the correct position. The user can move the selected image 351 including two or more partial images 310 and easily.

In addition, while the feature images 350 and the display image 353 have been supposed to be binary images in the above embodiment, it is also possible to form them as multivalued images. In such an example, the feature images 350 are generated without the binarization process, and multivalued pixel values in a feature image 350 corresponding to the selected image 351 are directly used for the display image 353. When such a display image 353 is displayed on the screen of the display section 601, pixels having smaller pixel values are treated as more transparent and pixels having larger pixel values are displayed more white, for example. Thereby display of the display image 353 reflecting the level of the feature can be realized.

It is also possible to generate the feature images 350 in the form of multivalued images and generate the display image 353 as a binary image. In such an example, binarization for generating the display image 353 may be executed optimally by utilizing optimum threshold values depending on each particular overlap region 352 between the selected image 351 and other partial images 310. Thereby optimum binarization depending on the character of each particular overlap region 352 can be executed to the feature images 350, and thus a display image 353 correctly reflecting local characteristics of the selected image 351 can be generated.

In addition, although the user could only move the selected image 351 in the above embodiment, it is also possible to arrange the image position adjustment device 300 according to the present invention so that the user can execute rotation, scaling up, scaling down, etc. to the selected image 351. By such composition, partial images which have been obtained in different scales, different angles, etc. can also be handled to adjust their alignment.

The image position adjustment device 300 according to the present invention can be constructed in various ways. For example, the image memory 108 and the image attribute memory 109 can be included in the housing of the image position adjustment device 300 as shown in FIG. 4, or can be provided independently. The pointing device 313, the display method switching button 314 and the image selection button 312 can also be realized by a keyboard, etc.

Further, the image position adjustment device 300 can also be realized on commercially available personal computers etc. In such an example, a computer-readable program which can instruct the computer to execute the functions of the image position adjustment device 300 shown in FIG. 1 is stored in a record medium, and the computer is operated according to the program which is read out from the record medium.

As set forth hereinabove, by the image position adjustment device and the computer-readable record medium according to the present invention, the user can adjust alignment between two or more images easily and efficiently, easily determining whether or not the selected image is in proper alignment with other images. Such effects are obtained basically due to the functions of the image position adjustment device or the computer-readable record medium for displaying the display image (based on the feature image of the selected image) and other images in overlapping status with the display image displayed at the forefront of the screen.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image position adjustment device for enabling a user to adjust alignment between two or more reference images, comprising:

a feature extraction section that extracts features which provide the user with clues effective for image position adjustment from each of the reference images and uses the extracted features to generate a feature image associated with each of the reference images;

an image selection device operable by a user to select at least one of the reference images as a target of image position adjustment;

a display image generation section that generates a composite display image from components including part or the whole of the selected reference image, and at least one other reference image, using a corresponding part or the whole of the feature image associated with the selected reference image;

a display unit operative to display the composite image; and a displaying order setting section that sets a layering order for display of the components of the display image on the display unit.

2. An image position adjustment device as claimed in claim 1, wherein the display image generation section generates the display image using the feature image of the selected reference image only for overlapping regions between the selected reference image and other reference images.

3. An image position adjustment device which utilizes an image memory for storing two or more images and an image attribute memory for storing information concerning the position and attributes of the images, displays the images stored in the image memory on a screen of a display unit, and enables a user adjust the positions of the images displayed on the screen by referring to the image attribute memory, comprising:

a feature extraction section for generating feature images which provide the user with clues effective for image position adjustment corresponding to each of the images which are stored in the image memory;

an image selection element for selecting one of the images as the target of image position adjustment according to a selection by the user, and storing the result of the selection in the image attribute memory as an attribute;

an image position changing section for changing the position of the image which has been selected by the image selection section, and storing the changed position of the selected image in the image attribute memory as the information concerning the position;

a display image generation section for generating a display image for part or the whole of the selected image, by referring to the image attribute memory and using a corresponding part or the whole of the feature image of the selected image; and a displaying order setting section for setting a displaying order of images so that the display image which has been generated by the display image generation section using the feature image of the selected image can be displayed in front of other images, and enabling the display unit to display the images according to the displaying order.

4. An image position adjustment device as claimed in claim 3, wherein the display image generation means generates the display image using the feature image of the selected image, only for overlap regions between the selected image and other images.

5. An image position adjustment device as claimed in claim 3, further comprising a display method switching element for receiving a request of the user for switching a display method, and enabling the displaying order setting section to set the displaying order of images so that the selected image will be displayed in front of other images if the user requests switching of the display method.

6. An image position adjustment device as claimed in claim 3, wherein the feature extraction section generates the feature images as binary images by executing an edge detection procedure and a binarization procedure on the images which are stored in the image memory.

7. An image position adjustment device as claimed in claim 6, wherein the display image generation section generates the display image for part or the whole of the selected image by copying a corresponding part or the whole of the feature image of the selected image.

8. An image position adjustment device as claimed in claim 3, wherein the feature extraction section generates the feature images as multivalued images by executing an edge detection procedure on the images which are stored in the image memory.

9. An image position adjustment device as claimed in claim 8, wherein the display image generation section generates the display image for part or the whole of the selected image by copying a corresponding part or the whole of the feature image of the selected image.

10. An image position adjustment device as claimed in claim 8, wherein the display image generation section generates the display image for part or the whole of the selected image using a corresponding part or the whole of the feature image of the selected image by binarization of the feature image.

11. An image position adjustment device as claimed in claim 3, further comprising a rotation section for rotating the selected image according to instructions of the user.

12. An image position adjustment device as claimed in claim 3, further comprising a scaling means for scaling up and scaling down the selected image according to instructions of the user.

13. A computer-readable recording medium storing an image position adjustment program for enabling a user to execute image position adjustment between two or more reference images on a computer, wherein the image position adjustment program instructs the computer to realize:
   a feature extraction function for extracting features which provide the user with clues effective for image position adjustment from each of the reference images and for using the extracted features to generate feature images corresponding to each of the images;
   an image selection function responsive to selection by a user of at least one of the reference images as a target of image position adjustment;
   a display image generation function for generating a composite display image from components including part or the whole of the selected reference image, and at least one other reference image, using a corresponding part or the whole of the feature image associated with the selected reference image;
   a displaying order setting function for setting a layering order for display of the components of the display image on a display unit.

14. A computer-readable recording medium as claimed in claim 13, wherein the display image generation function generates the display image using the feature image of the selected reference image only for overlapping regions between the selected reference image and other reference images.

15. A computer-readable recording medium storing an image position adjustment program for instructing a computer to utilize one or more storage devices as an image memory for storing two or more images and an image attribute memory for storing information concerning the position and attributes of the images, to display the images stored in the image memory on a screen of a display unit, and to enable a user who operates a pointing unit to adjust the positions of the images displayed on the screen by referring to the image attribute memory wherein the image position adjustment program instructs the computer to realize:
   a feature extraction function for generating feature images which provide the user with clues effective for image position adjustment procedure corresponding to each of the images which are stored in the image memory;
   an image selection function for selecting one of the images as the target of image position adjustment according to a selection by the user, and storing the result of the selection in the image attribute memory as an attribute;
   an image position changing function for changing the position of the image which has been selected by the image selection function, and storing the changed position of the selected image in the image attribute memory as the information concerning the position;
   a display image generation function for generating a display image for part or the whole of the selected image, by referring to the image attribute memory and using a corresponding part or the whole of the feature image of the selected image; and
   a displaying order setting function for setting a displaying order of images so that the display image which has been generated by the display image generation function using the feature image of the selected image can be displayed in front of other images, and enabling the display unit to display the images according to the displaying order.

16. A computer-readable recording medium as claimed in claim 15, wherein the display image generation function generates the display image using the feature image of the selected image only for overlapping regions between the selected image and other images.

17. A computer-readable recording medium as claimed in claim 15, wherein the image position adjustment program further instructs the computer to realize a display method switching function for receiving a request of the user for switching a display method, and enabling the displaying order setting function to set the displaying order of images so that the selected image will be displayed in front of other images if the user requested switching of the display method.

18. A computer-readable recording medium as claimed in claim 15, wherein the feature extraction function generates the feature images as binary images by executing an edge detection procedure and a binarization procedure on the images which are stored in the image memory.

19. A computer-readable recording medium as claimed in claim 18, wherein the display image generation function generates the display image for part or the whole of the selected image by copying a corresponding part or the whole of the feature image of the selected image.

20. A computer-readable recording medium as claimed in claim 15, wherein the feature extraction function generates the feature images as multivalued images by executing an edge detection procedure on the images which are stored in the image memory.

21. A computer-readable recording medium as claimed in claim 20, wherein the display image generation function generates the display image for part or the whole of the selected image by copying a corresponding part or the whole of the feature image of the selected image.

22. A computer-readable recording medium as claimed in claim 20, wherein the display image generation function generates the display image for part or the whole of the selected image using a corresponding part or the whole of the feature image of the selected image by binarization of the feature image.

23. A computer-readable recording medium as claimed in claim 15, wherein the image position adjustment program further instructs the computer to realize a rotation function for rotating the selected image according to instructions of the user.

24. A computer-readable recording medium as claimed in claim 15, wherein the image position adjustment program further instructs the computer to realize a scaling function for scaling up and/or scaling down the selected image according to instructions of the user.

* * * * *